(12) United States Patent
Demeocq (10) Patent No.: US 10,731,693 B2
(45) Date of Patent: Aug. 4, 2020

(54) SCREW INSTRUMENTED WITH EXTENSOMETRIC STRAIN GAUGES TO MEASURE THE TENSILE AND/OR SHEAR STRAIN EXPERIENCED BY THE SCREW

(71) Applicants: TEXYS.FR, Varennes-vauzelles (FR); Etienne Demeocq, Nevers (FR)

(72) Inventor: Etienne Demeocq, Nevers (FR)

(73) Assignees: TEXYS.FR, Varennes-Vauzelles (FR); Etienne Demeocq, Nevers (FR)

( * ) Notice: Subject to any disclaimer, the term of this patent is extended or adjusted under 35 U.S.C. 154(b) by 323 days.

(21) Appl. No.: 15/742,090

(22) PCT Filed: Jul. 8, 2016

(86) PCT No.: PCT/FR2016/051749
§ 371 (c)(1),
(2) Date: Jan. 5, 2018

(87) PCT Pub. No.: WO2017/006068
PCT Pub. Date: Jan. 12, 2017

(65) Prior Publication Data
US 2018/0195547 A1    Jul. 12, 2018

(30) Foreign Application Priority Data
Jul. 9, 2015  (FR) ...................... 15 56518

(51) Int. Cl.
*F16B 31/02* (2006.01)
*G01L 5/24* (2006.01)
*G01L 1/22* (2006.01)

(52) U.S. Cl.
CPC ............. *F16B 31/02* (2013.01); *G01L 1/22* (2013.01); *G01L 5/24* (2013.01); *F16B 2031/022* (2013.01)

(58) Field of Classification Search
CPC ...... F16B 1/0071; F16B 31/02; F16B 31/025; F16B 2031/022; G01L 1/22; G01L 5/24
(Continued)

(56) References Cited

U.S. PATENT DOCUMENTS 2,600,029 A * 6/1952 Rivington ............. G01L 1/2212
73/761
3,201,977 A  8/1965 Sannohashi
(Continued)

FOREIGN PATENT DOCUMENTS

DE        44 10 722 A1     10/1995
WO       2015/075823 A1     5/2015

OTHER PUBLICATIONS

International Search Report, dated Nov. 17, 2016, from corresponding PCT/FR2016/051749 application.
(Continued)

*Primary Examiner* — Roberta S Delisle
(74) *Attorney, Agent, or Firm* — Young & Thompson (57) ABSTRACT

Screw having a head and a threaded cylindrical body, the head being provided with strain gauges arranged so as to be deformed in order to measure a stress within the screw, the gauges being connected or able to be connected to a power supply and to a determination unit for determining the value of at least one inner stress from the deformations of the gauges. The head has, on the upper face thereof, a conical hole having a revolution axis that is aligned with the revolution axis of the cylindrical body. The gauges are arranged on the wall of the conical hole so as to be deformed together with the conical hole and are oriented to measure at least one type of inner stress selected among the tension and the shearing.

14 Claims, 3 Drawing Sheets

(58) Field of Classification Search
USPC ...................................................... 411/8, 14
See application file for complete search history.

(56) References Cited

U.S. PATENT DOCUMENTS

| | | | | |
|---|---|---|---|---|
| RE30,183 E | * | 1/1980 | Popenoe | G01B 7/22 |
| | | | | 331/65 |
| 4,428,240 A | * | 1/1984 | Schoeps | G01L 5/24 |
| | | | | 411/14 |
| 7,293,466 B2 | * | 11/2007 | Ohta | F16B 31/02 |
| | | | | 257/417 |
| 7,441,462 B2 | * | 10/2008 | Kibblewhite | F16B 31/02 |
| | | | | 73/761 |
| 7,973,671 B2 | * | 7/2011 | Cloutier | F16D 9/06 |
| | | | | 116/200 |
| 8,521,448 B1 | * | 8/2013 | Ung | F16B 1/0071 |
| | | | | 702/42 |
| 8,584,957 B2 | * | 11/2013 | Zhu | G06K 19/07779 |
| | | | | 235/375 |
| 2008/0253858 A1 | * | 10/2008 | Hsieh | F16B 31/02 |
| | | | | 411/14 |
| 2009/0151466 A1 | * | 6/2009 | Wu | F16B 31/025 |
| | | | | 73/761 |
| 2010/0054891 A1 | * | 3/2010 | Nishida | B25B 23/14 |
| | | | | 411/9 |
| 2014/0251027 A1 | | 9/2014 | Hsieh | |
| 2017/0138387 A1 | | 5/2017 | Saigo et al. | |

OTHER PUBLICATIONS

FR Search Report, dated May 10, 2016, from corresponding FR1556518 application.

* cited by examiner

SCREW INSTRUMENTED WITH EXTENSOMETRIC STRAIN GAUGES TO MEASURE THE TENSILE AND/OR SHEAR STRAIN EXPERIENCED BY THE SCREW

The present invention relates to the field of the tightening of screws, and particularly to a screw with means allowing to know the stresses therein during and/or after tightening.

During the operation of tightening a screw, it can be necessary to know accurately the stresses within the screw. This is also useful for the maintenance of the assemblies made with screws, since it is desirable to ensure that the tightening remains adequate over time.

Indeed, a tightening that is too strong can deteriorate the screw or the part in which it is screwed, and a tightening that is too weak can cause the screw to be separated from said part. The tightening results in the application of a tensile force on the screw, in the longitudinal direction of the latter, thereby resulting in tensile stresses within the screw and resulting in an extension thereof.

Furthermore, the screw can undergo a shearing by the parts to which it is screwed, for example due to a misalignment of the holes in which the screw is screwed or simply due to the action-effects that said parts undergo in operation. This shearing will create shearing stresses within the screw, which can cause a loosening or, in the worst case, can cause the screw to break.

The conventional devices for measuring the tightening torque, namely the tightening tools comprising a dynamometer, allow to tighten a screw with a torque applied to the screw that is precisely known. However, the torque applied to the screw does not necessarily correspond to the tightening that is obtained, in particular because the latter depends on the friction, materials, etc. Thus, these devices do not allow to ensure the tightening.

Thus, in order to ensure the tightening, one is seeking to measure the inner tensile stresses within the screw, rather than the tightening torque. Indeed, the clamping of two parts against each other directly corresponds to the tensile force applied to the screw, and thus to the extension of the latter.

The use of stress measuring devices integrated into the screw is known. In particular, they allow to obtain a value of the extension of the screw using specific techniques, such as the ultrasound technique or the control bar technique.

However, these techniques have one or several of the following disadvantages:
- the equipments being implemented are complex,
- the screw is bored up into the threaded part in the case of the control bar, resulting in an embrittlement,
- the measurement depends on the length of the screw and the stresses have to be calculated according to each type of screw, and
- the technique can be adapted only to screws having a relatively large size and allows to measure only a tensile stress.

Figure 1:
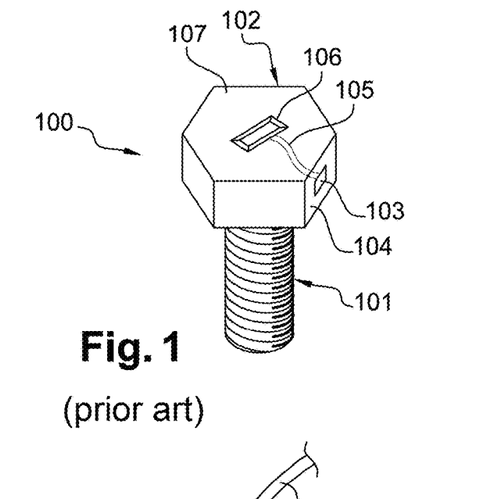
FIGS. 1 and 2 are perspective and vertical cross-sectional views, respectively, of screws with stress measurement gauges according to the prior art.

To solve these problems, Taiwanese patent TW 1310810 suggests a screw 100, shown in FIG. 1, consisting in a threaded cylindrical body 101 and a head 102, having a strain gauge 103 on the lateral wall 104 of said head, the gauge 103 being connected by a wire 105 to processing and displaying means 106 arranged on the upper face 107 of the screw head 102.

Thus, the end user can periodically check that the tightening stress remains adequate over time.

With such a screw 100, the gauge 103, during the tightening, can be damaged by the tightening means, such as a wrench. Furthermore, it is necessary to bore a hole in the screw so as to pass the wire 105 therethrough, and the detected deformations are small and thus difficult to assess precisely.

Figure 2:
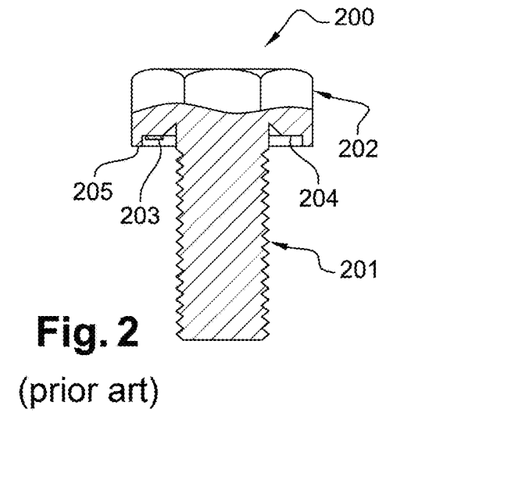

To solve these problems, U.S. patent application US 2014251027 discloses a screw 200, shown in FIG. 2, consisting in a threaded cylindrical body 201 and a head 202, comprising at least one strain gauge 203 arranged in an annular groove 204 formed on the lower face 205 of the screw head 202 and adjacent to the cylindrical body 201.

The one or more gauges 203 can transmit the values they have measured to a display device outside the screw, either wirely with a wire passing through a hole bored in the screw head 202, or wirelessly, in which case each gauge 203 incorporates electronics with wireless transmission.

However, this screw has several disadvantages:
- a wireless communication between the gauges and the outer display device is difficult, since the gauges are trapped between the screw and the parts to which it is screwed, which are generally made of metal and thus prevent the transmissions;
- the gauges are only slightly deformed during the tightening and it is thus necessary to have a strong deformation of the head in order to obtain a measurable signal;
- the gauges are arranged below the head, in the area thereof where the tightening pressure is applied, and can thus be easily damaged;
- the gauges are made inaccessible once the tightening has been done; and
- stresses that are parasitic for determining the tightening stress, such as shearing, can contribute to the deformation of the gauges, such that the tightening stress being actually applied is not correctly measured, which tightening stress corresponds to a deformation of the gauges that due only to the tensile stress within the screw along the longitudinal direction thereof.

The present invention is intended to solve the problems with the above-described screws with measurement gauges, and thus to suggest a screw the measurement of inner stresses of which is easier and more reliable for providing a better control of the tightening performed by the screw over time, and the gauges of which are less prone to be damaged.

The present invention relates to a screw having a screw head and a threaded cylindrical body, the screw head being provided with strain gauges arranged so as to be deformed together with the deformation of the screw head, in order to measure a stress within the screw, said gauges being connected or able to be connected to a power supply and to determination means for determining the value of at least one stress within the screw from the deformations of said gauges, characterized in that the screw head has, on the upper face thereof, a conical hole having a revolution axis that is aligned with the revolution axis of the cylindrical body of the screw, and in that said gauges are arranged on the wall of the conical hole so as to be deformed together with the deformation of the conical hole, said gauges being oriented so as to measure at least one type of stress within the screw selected among the tension and the shearing, in order to determine the stresses in the cylindrical body.

The solution according to the present invention allows an amplification of the deformation of the strain gauges when the screw is stressed, in order to make the measurements of the shearing and/or tensile stresses more reliable, without any parasitic measurements, and besides the gauges are protected from damage.

According to a first particular embodiment, the screw head is provided with four strain gauges, so-called gauges for tension, wherein two gauges are each arranged with the main measurement direction thereof being aligned with a generatrix of said conical hole, the two generatrixes being diametrically opposed, and the two others gauges are each arranged with the main measurement direction thereof being on a circle formed at the intersection of the wall of said conical hole and an imaginary plane parallel to the upper face of the screw head, and are distributed at equidistance from each other on the circumference of said circle, each one being preferably centered on a respective one of said two generatrixes, the four gauges being connected by a Wheatstone bridge connected or able to be connected to the power supply and to the determination means, said gauges allowing to measure the inner tensile stress when shearing is not applied in the screw head.

According to a second embodiment, the screw head is provided with four first strain gauges, so-called gauges for tension, and four second strain gauges, also so-called gauges for tension, wherein said first gauges are each arranged with the main measurement direction thereof being aligned with a generatrix of said conical hole and are distributed with an uniform angle between each other, and said second gauges are each arranged with the main measurement direction thereof being on a circle formed at the intersection of the wall of said conical hole and an imaginary plane parallel to the upper face of the screw head, and are distributed at equidistance from each other on the circumference of said circle, said first gauges forming two groups of gauges each comprising two first gauges that are adjacent and electrically connected in series and said second gauges forming two other groups of gauges each comprising two second gauges that are adjacent and electrically connected in series, the four groups of gauges being connected by a Wheatstone bridge connected or able to be connected to the power supply and to the determination means, said first and second gauges allowing to measure the inner tensile stress in the screw head in order to know the stresses within the cylindrical body.

Preferably, the screw head is a hexagonal head and the main measurement direction of each of said first gauges forms an angle between 30 and 10 degrees, preferably of 15 degrees, with respect to a generatrix joining the apex of the conical hole to a point of intersection of the generating circle of the conical hole with a line segment joining two opposite apexes of the hexagon defining the outline of the upper face of the screw head.

Each second gauge can be located between the main measurement directions of two adjacent first gauges.

Preferably, each second gauge is centered on the main measurement direction of a corresponding one of said first gauges. "Centered" means that the main measurement direction of the first gauge passes through the center of the second gauge, in the main measurement direction of the latter.

More preferably, each second gauge is integral with the corresponding first gauge, in the form of a double-gauge rosette.

According to a third particular embodiment, the screw head is provided with four strain gauges, so-called gauges for shearing, the first and third gauges being arranged parallel to two generatrixes located at 45° on either side of a main generatrix of the conical hole, the two other gauges being arranged parallel to two generatrixes located at 45° on either side of another main generatrix of the conical hole that is diametrically opposed to said main generatrix of the conical hole, the four gauges being connected by a Wheatstone bridge connected or able to be connected to the power supply and to the determination means, said gauges allowing to measure the inner shearing stress in the screw head in order to know the stresses in the cylindrical body.

Preferably, the conical hole has a height lower than or equal to that of the screw head.

Preferably, the angle at the apex of the cone is between 70 and 150 degrees, preferably between 75 and 120 degrees, and most preferably is of 90 degrees.

The four gauges for shearing can be arranged together with the gauges for tension, or arranged without the gauges for tension.

Preferably, a groove is formed on the lower surface of the screw head and in a concentric and adjacent manner with respect to the threaded cylindrical body.

The strain gauges can be connected or able to be connected to the power supply and to the determination means by wired connection.

The strain gauges can be connected or able to be connected to the power supply and to the determination means in a wireless manner, the gauges being connected to a first near field communication (NFC) type wireless transceiver, and the power supply and the determination means being connected to a second NFC type wireless transceiver, the first and second transceivers being able to wirelessly transmit power and information therebetween.

To better illustrate the subject-matter of the present invention, several particular embodiments thereof will be described below, for indicative and non-limiting purposes, with reference to the appended drawings.

Figure 3A:
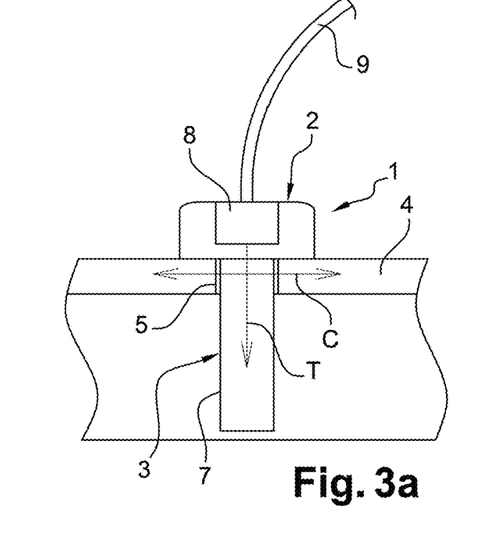
FIG. 3a is a schematic view of a screw according to the present invention, joining two parts, and connected by a wire to a power supply and to determination means.

If first referring to FIG. 3a, a schematic layout of a screw 1 according to the present invention is shown, comprising a head 2 and a threaded cylindrical body 3 and connecting a first part 4 having a through hole 5 and a second part 6 having a tapped blind hole 7 the tapping of which corresponds to the threading of the threaded body 3.

The screw 1 can be subjected to a tensile stress along the arrow T, a shearing stress along the two-way arrow C, or both stresses together.

The screw 1 comprises a strain gauge assembly 8 connected to a power supply and means for determining inner stress(es) (not shown).

The means for determining inner stress(es) are here a voltmeter allowing to measure the voltage at the terminals of a Wheatstone bridge, which will be described in detail below.

Figure 3B:
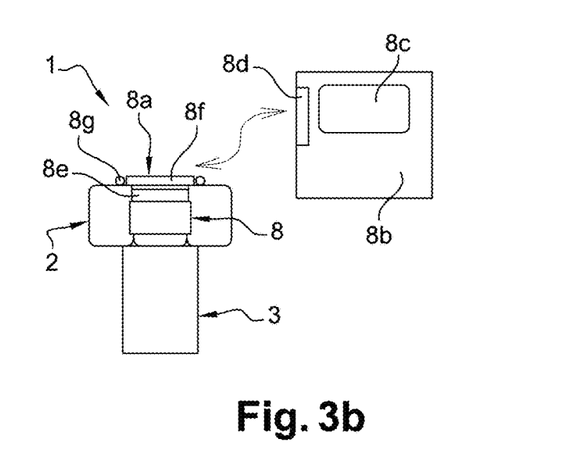
FIG. 3b is a schematic view of a screw according to the present invention, wirelessly connected to a power supply and to determination means.

The gauge assembly 8 can be connected to said power supply and to said determination means, either by a wired connection 9 as shown in FIG. 3a, or by a wireless connection as shown in FIG. 3b. In the latter case, the gauge assembly 8 is connected to a first (near field communication) NFC type wireless transceiver 8a, and the power supply 8b and the determination means 8c are connected to a second NFC type wireless transceiver 8d, the first and second transceivers 8a, 8d being able to wirelessly transmit power and information between them.

More precisely, the first wireless transceiver 8a consists in an amplifier 8e, a NFC chip 8f and a circular antenna 8g surrounding the amplifier 8e, these elements being integrated in the gauge assembly 8, and forming the upper part of the latter. The second wireless transceiver 8d comprises similar elements (not shown).

The advantage of such wireless communication is that it allows, during the service life of the screw 1, to arrange the second transceiver 8b near the screw 1 at any time in order to read the stress value of the screw 1, so as to check that the latter is correctly tightened and, otherwise, to proceed to a new tightening.

Figure 4:
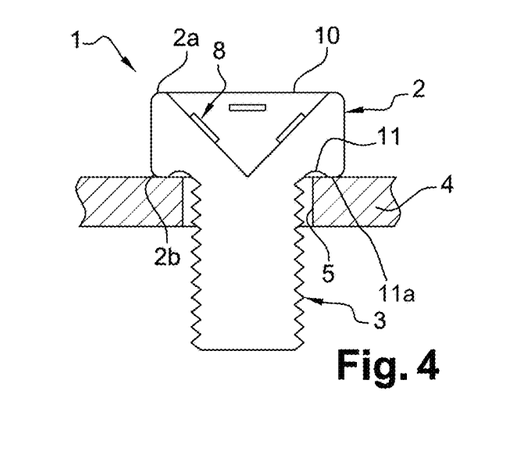
FIG. 4 is a schematic layout, in vertical cross section, of a screw according to the present invention.

If referring to FIG. 4, it can be noted that the gauge assembly 8 comprises strain gauges which are installed in a conical hole 10 provided on the upper face 2a of the head 2, and the revolution axis of which is aligned with that of the cylindrical body 3, such that the hole 10 is provided in the middle of the head 2.

The gauges are attached in the conical hole 10 by bonding. Bonding should be performed in an accurate manner, such that the deformation of the gauge reflects the deformation of the part as close as possible.

The height of the conical hole 10 here is substantially equal to that of the screw head 2, but it can be lower than the latter. The angle at the apex of the conical hole 10 here is 90 degrees. It can be noted that this size of the conical hole 10 is not restrictive and is given only as an example, and the appended figures are non-limiting schematic views.

The conical hole 10 allows to amplify the deformations undergone by the gauges when the screw head 2 is subjected to a stress.

Indeed, in the prior art, the gauges are arranged on a lateral face of the screw head, or within a groove formed on the lower face thereof.

In case of tension, a gauge arranged on a lateral face of the screw head is subjected to a very small shrinking, since the bottom portion of said face bears on the support on which the screw is tightened, the head crashing very slightly at this location, and a gauge arranged in the groove is subjected to a small deformation even in the presence of a strong stress, this portion of the screw being subjected to small deformations at this location.

Gauges arranged in the conical hole 10 will be more deformed than the gauges of the screws of the prior art, since the bottom portion of the conical hole 10 will be pulled downwards in case of a tension oriented downwards, and therefore, the generatrix of the conical hole 10 will extend more significantly than a lateral face of the screw head or the groove.

Moreover, the arrangement of the gauges in the conical hole 10 allows, if necessary, to check the latter in an easy and rapid manner, which is not possible with the screws of the prior art.

Furthermore, arranging the gauges in the conical hole 10 allows to protect them. Indeed, contrary to the prior art, the gauges cannot be damaged by a tool or an excessive tightening.

The first transceiver, when present, could be attached to the wall of the conical hole 10, for example, by bonding the edges of the NFC chip against said wall, or, otherwise, could be bonded on the upper face 2a of the head 2, with covering the conical hole 10, in the case of a smaller screw.

A groove 11 is provided on the lower face 2b of the head 2 and is adjacent to the threaded cylindrical body 3.

The groove 11 allows to ensure that the bearing of the screw head 2 is not too close to the threaded cylindrical body 3 and that the deformation of the screw head 2 does not depend on the installation thereof. Indeed, the hole 5 of the support 4, in which the screw passes, is generally slightly wider than the screw, in order to help the latter to pass therethrough. Thus, there is a clearance between the screw and said hole, and the screw can be positioned in an offset manner in said hole, such that the clearance is not identical on the entire circumference of the hole. The bearing surface of the screw head depends on said clearance, and if the bearing surface decreases, the stresses will be more important and the deformation will be stronger.

It can thus be noted that the deformation depends on the surface of the screw head 2 bearing on the support 4.

The groove 11 allows to ensure that a same bearing surface 11a will bear on the support 4, regardless of the position of the screw 1 in the hole 5.

In FIG. 4, the screw 1 is centered, it can be understood that, if it is offset on the left or on the right, there will always be the same bearing surface 11a. Therefore, the deformations of the gauges do not depend on the position of the screw 1 with respect to the hole 5.

FIRST EMBODIMENT

Figure 5:
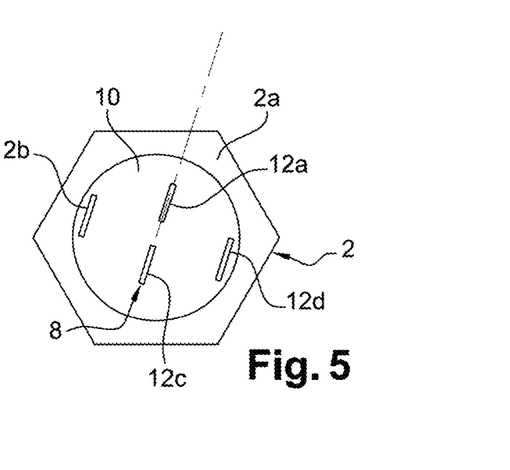
FIG. 5 is a schematic layout of the arrangement of the gauges, in top view, of the screw according to the first embodiment.
Figure 6:
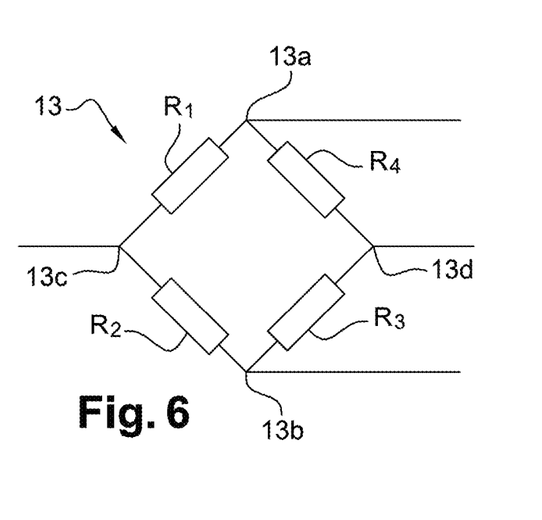
FIG. 6 is an electrical diagram of the Wheatstone bridge connecting the gauges of the screw according to the invention.

If referring to FIGS. 5 and 6, it can be noted that strain gauges, in particular four strain gauges 12a-12d, are attached in the conical hole 10.

Each of the gauges 12a-12d has a main measurement direction, shown by the orientation of the represented segment forming each of the gauges 12a-12d in FIGS. 4 and 5. Here, the main measurement direction of a gauge is the longitudinal direction of the gauge, along which the gauge extends or shortens.

Two first gauges 12a, 12c are each arranged with the main measurement direction thereof being aligned with a generatrix of said conical hole 10, said generatrixes being diametrically opposed.

Two second gauges 12b-12d are each arranged with the main measurement direction thereof being on a circle formed at the intersection of the wall of said conical hole 10 and an imaginary plane parallel to the upper face 2a of the screw head 2, and are diametrically opposed.

The four gauges 12a-12d, and more generally the gauges of the gauge assembly 8, are electrically connected by a Wheatstone bridge 13 electrically supplied with the power supply at two points 13a and 13b, the Wheatstone bridge 13 being further connected to the means for determining inner stress(es), here a voltmeter, at two points 13c and 13d.

In order to simplify the reading, the terms R1-R4 are used to define the value of the resistance of the gauges 12a-12d. The following group of equations (1) is thus provided:

$$R1=R(12a); R2=R(12b);$$

$$R3=R(12c); \text{ and } R4=R(12d).$$

The equation (2) associates the resistance values R1-R4 with the input and output voltages, respectively Ve (voltage applied between 13a and 13b) and Vs (voltage measured between 13c and 13d), of the Wheatstone bridge 13:

$$Vs=[Ve \cdot (R1 \cdot R3-R2 \cdot R4)]/[(R2+R1) \cdot (R3+R4)] \quad (2)$$

In the initial state, that is when no stress is applied on the screw 1, the gauges 12a-12d have the same resistance value.

Thus, generally and for the following description, it will be considered that each of the gauges has a same resistance value R at the initial state.

In this instance, R1=R2=R3=R4=R.

By substitution in the equation (2), one obtains:

$$Vs=[Ve \cdot (R^2-R^2)]/[(2R) \cdot (2R)].$$

It can be understood that, since $R^2-R^2=0$, Vs=0 regardless of Ve. The bridge is thus balanced, at this initial state.

Conversely, it can be understood that the bridge is balanced when the equation (3) is satisfied:

$$R1 \cdot R3-R2 \cdot R4=0 \quad (3)$$

The behaviour of the gauges and the associated measurements for different cases of tensile stresses will now be examined.

Case of Tension Alone

Figure 7:
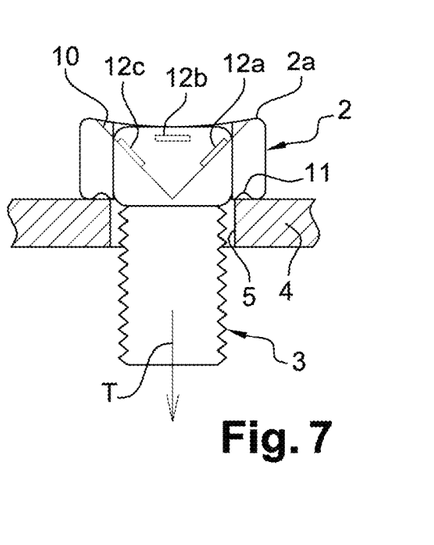
FIG. 7 is a schematic layout, in vertical cross section, of a screw according to the first embodiment of the present invention, subjected to a tensile stress due to the application of a tightening torque.

If referring to FIG. 7, it can be noted that, when a tensile force T is applied on the screw 1, particularly during the tightening of it, the screw head 2 is deformed such that the upper surface 2a thereof becomes concave. In such a case, the first gauges 12a, 12c extend while the second gauges 12b, 12d shorten.

The resistance value of a strain gauge is proportional to the length thereof, and increases when the gauge extends and decreases when the gauge shortens.

Thus, the resistance value of the first gauges 12a, 12c increases by a given value, for example A, and the resistance value of the second gauges 12b, 12d decreases by a given value, for example -B.

By substitution in the group of equations (1), one obtains: R1=R3=R+A, et R2=R4=R-B.

Then, by substitution in the equation (3), one obtains:

$$R1 \cdot R3 - R2 \cdot R4 = (R+A)^2 - (R-B)^2$$

$$= A^2 - B^2 + 2RA + 2RB \neq 0.$$

Even in the case where the first gauges extend as much as the second gauges shorten, namely with A=B, and by substitution of B with A in (3), one still obtains (3)=4RA≠0.

The equation (3) is not satisfied, and a non-zero voltage Vs is measured.

It has been experimentally verified that the tensile stress is related to the voltage Vs by a linear mathematical relation. In other words, the tensile stress is proportional to the measured electrical voltage.

Figure 8:
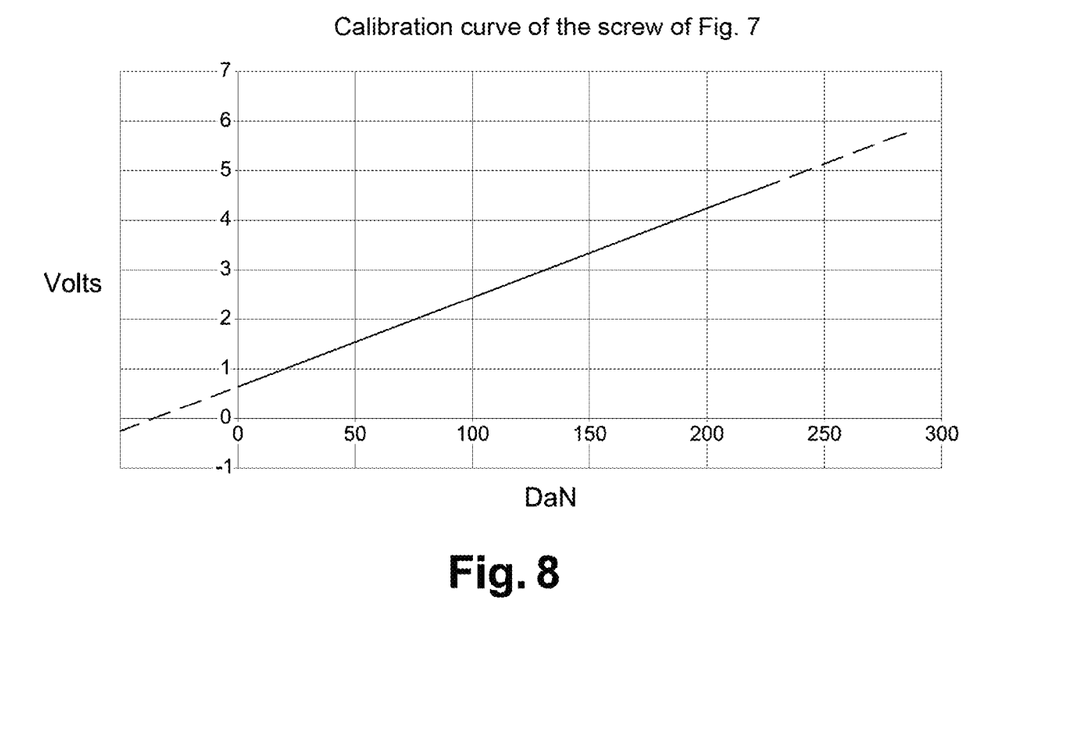
FIG. 8 is a calibration curve of a screw according to the first embodiment.

An example of voltage/stress calibration straight line is shown in FIG. 8. In order to establish it, different known tensile forces are applied on the screw 1 and, for each of them, the voltage at the Wheatstone bridge 13 is measured. Thus, the tensile force can be known by knowing the voltage measured at the bridge 13.

It is necessary to establish such a calibration straight line for each type of screws because the proportionality coefficient, namely the slope of the straight line, is different for each screw. Indeed, it depends, among other things, on the specific shape of the screw 1, the length thereof, the size of the screw head 2 and the specific position of the gauges.

Thus, in practice, the screw and the corresponding calibration straight line will be provided to the end user, such that the user can know the value of the tensile stress from the voltage value provided by the means for determining inner stress(es).

Case of Shearing Alone

When applying a shearing force alone on the screw 1, the screw head 2 shortens in the shearing direction and extends in the direction orthogonal to the shearing. In such a case, the first gauges 12a, 12c are only slightly deformed and the second gauges 12b, 12d extend or shorten according to the direction of the shearing.

In particular, when a shearing oriented along an axis passing through the gauges 12a and 12c is applied, the gauges 12b and 12d shorten.

Thus, the resistance value of the gauges 12a, 12c is not modified, or will be negligibly modified, and the resistance value of the second gauges 12b, 12d decreases by a same value -C.

One thus obtains R2=R4=R-C; and R1=R3=R.

By substitution in the equation (3), one obtains:

$$(3) = R^2 - (R-C)^2$$

$$= R^2 - R^2 - C^2 + 2RC$$

$$= -C^2 + 2RC \neq 0.$$

The equation (3) is not satisfied, and a non-zero voltage Vs is measured, whereby the shearing is measured.

Similarly, a shearing oriented in the same direction as the gauges 12b and 12c will extend the latter.

Thus, one will obtain R2=R4=R+C and (3)=$C^2$-2RC≠0. A voltage value is thus obtained, which translates the shearing stress undergone by the screw. However, this measurement is a parasitic measurement and it is not the purpose of the screw according to the first embodiment of the present invention.

Case of Simultaneous Tension and Shearing

In the case of tension and shearing being simultaneously applied, for example, shearing along an axis passing through the gauges 12a and 12c is applied, the following behaviour of the gauges is observed:

the gauges 12a and 12c extend under the effect of the tension, the shearing generating a deformation thereof which is very low and thus negligible, and the gauges 12b and 12d shorten under the effect of the tension and further shorten under the effect of the shearing.

One thus obtains:

$R1=R3=R+A$, and $R2=R4=R-B-C$.

By taking the equation (3), one obtains:

$$(3) = (R+A)^2 - (R-B-C)^2$$
$$= R^2 + A^2 + 2RA - R^2 - B^2 - C^2 + 2RB + 2RC - 2BC$$

Even in the case where the first gauges extend as much as the second gauges shorten under the effect of the tension, namely with A=B, and by substituting B with A in (3), one still obtains (3)=$4RA+-C^2+2RC-2AC \neq 0$.

It can be noted that a resistance value is measured, in which the components due to tension and shearing are mixed.

Thus, the screw according to the first embodiment allows to measure a tensile stress in an accurate manner, provided that no shearing is present.

In practice, both stresses can be applied, and the second and third embodiments allow to measure a tensile stress and a shearing stress, respectively, even in the case where both stresses are simultaneously applied.

SECOND EMBODIMENT

Figures 9, 10:
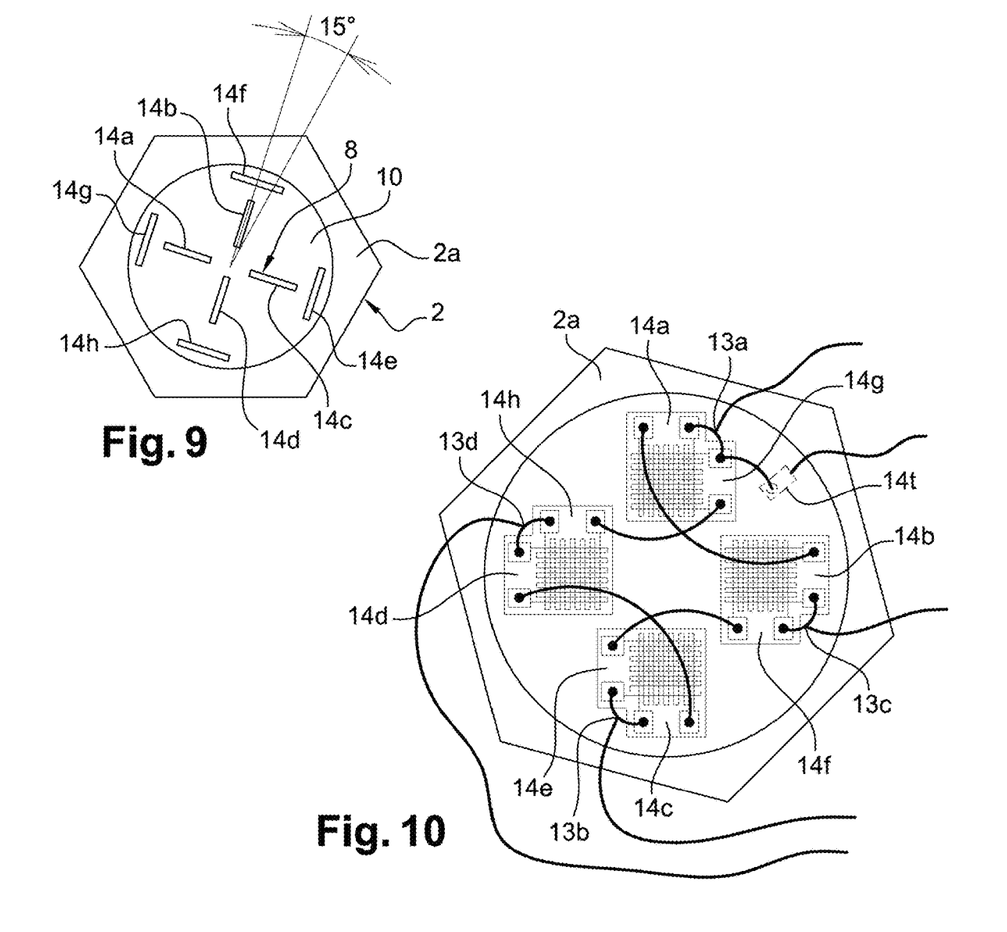
FIG. 9 is a schematic layout of the arrangement of the gauges, in top view, of a screw according to a second embodiment of the present invention.
FIG. 10 is a top schematic view of a screw according to the second embodiment, with the wiring of the gauges, the gauges being shown in horizontal position for depiction convenience purposes.

If referring to FIGS. 9 and 10, it can be noted that the screw head 2 according to the second embodiment of the present invention has eight strain gauges 14a-14h attached in the conical hole 10. Each of the gauges 14a-14h has a main measurement direction, shown by the orientation of the represented segment forming each of the gauges 14a-14h in FIG. 9.

Four first gauges 14a-14d are each arranged with the main measurement direction thereof being aligned with a generatrix of said conical hole 10 and are distributed with an uniform angle between them. In other words, the measurement direction of one of the gauges 14a-14d is at a right angle with respect to that of the two gauges 14a-14d that are adjacent thereto, when the screw 1 is in top view, as in FIG. 9.

Four second gauges 14e-14h are each arranged with the main measurement direction thereof being on a circle formed at the intersection of the wall of said conical hole 10 and an imaginary plane parallel to the upper face 2a of the screw head 2, and are distributed at equidistance from each other on the circumference of said circle. In other words, the gauges 14e-14h are opposed by pair and one of the gauges 14e-14h is spaced by a quarter circle from the two gauges 14e-14h that are adjacent thereto.

Furthermore, the second gauges are attached perpendicularly to said generatrixes and centered on the latters. In other words, each of the generatrixes crosses a second gauge, perpendicularly and at its center.

In FIGS. 9 and 10, it can also be noted that the screw head 2 is an hexagonal head, and that the main measurement direction of each of said first gauges 14a-14d forms an angle of 15 degrees with respect to a generatrix joining the apex of the conical hole 10 to a point of intersection of the generating circle of the conical hole 10 with a line segment joining two opposite apexes of the hexagon defining the outline of the upper face 2a of the screw head 2. In other words, the main measurement direction of one of the first gauges 14a-14d is rotated by 15 degrees with respect to a straight line passing through two opposite apexes of the hexagon forming the head 2 of the screw 1, with taking the apex of the conical hole 10 as the center of rotation. Since each of the first gauges 14a-14d is at 90 degrees with respect to the two gauges adjacent thereto, each of the gauges 14a-14d is oriented at 15 degrees with respect to a straight line passing through two opposite apexes of the hexagon forming the screw head 2.

Similarly, the second gauges 14e-14h are each arranged in an area having the same inertia as the others. The second gauges 14e-14h can be arranged near the first gauges 14a-14d, as shown in FIG. 9, or be integral therewith, as shown in FIG. 10 in which four double-gauge rosettes are used.

The orientation at 15 degrees allows to provide a same inertia on each gauge 14a-14h when tightening. Indeed, the fact that the screw head 2 is of a hexagonal shape induces, during tightening thereof, stresses with different intensities depending on the measurement location.

In particular, on an axis joining two opposite apexes of the hexagon forming the screw head 2, the amount of material to be moved is more significant, and therefore, the moment of inertia to be applied is more significant than on a perpendicular bisector of two opposite sides of the head 2.

Thus, the stresses measured by a gauge arranged on said axis will be lower than those measured by a gauge arranged on said perpendicular bisector.

The orientation at 15 degrees thus allows to provide an identical moment of inertia for each of the gauges 14a-14h.

The device 8 can also comprise a temperature sensor 14t, which allows to measure the temperature changes of the screw head 2.

As a matter of fact, a temperature change causes an expansion or contraction of the material forming the screw head 2, which extends or shorten the gauges 12a-12h, and a temperature change causes a change of the elasticity of the material forming the screw 1.

Furthermore, the sensitivity of the gauge also depends on the temperature, as well as the thermal drift of zero according to which the resistance of a gauge increases together with the temperature, in the absence of stress. It is thus necessary to take the temperature into account when measuring.

The compensation for the resistance value according to the temperature can be made in the amplifier 8e, in the case of a wireless measurement, or in the determination means, in the case of a wired measurement. In both cases, the temperature compensation follows a rule established empirically or by learning.

The compensation per se is a well known technique to correct the drift of zero and of sensitivity of the gauges.

In FIG. 10, an arrangement of the gauges 14a-14h, as well as the wiring of the Wheatstone bridge 13, are shown.

The wiring joining the gauges 14a-14h is also shown, which gauges 14a-14h are connected in series by pair, such that the resistance values thereof add, and form groups of gauges connected by a Wheatstone bridge 13.

Such a device 8 can be implemented, for example, on screws with a M4 size according to the ISO 4017 standard, namely a screw in which a distance between two opposite sides of the hexagon forming the head is 7 mm.

By taking the group of equations (1), one obtains:

$R1=R(14a)+R(14b); R2=R(14e)+R(14f);$ $R3=R(14c)+R(14d);$ and $R4=R(14g)+R(14h).$ Case of Tension Alone Similarly to the gauges 12a-12d of the first embodiment, when a tensile force T is applied on the screw 1, the first gauges 14a-14d extend while the second gauges 14e-14h shorten.

Thus, the resistance value of the first gauges 14a-14d increases by a value D, and the resistance value of the second gauges 14e-14h decreases by a value −E.

By substitution in the group of equations (1), one thus obtains: R1=R3=2R+2D, et R2=R4=2R−2E.

Then, by substitution in the equation (3), one obtains:

$$(3) = (2R+2D)^2 - (2R-2E)^2$$
$$= 4D^2 - 4E^2 + 8RD + 8RE \neq 0.$$

Even in the case where the first gauges extend as much as the second gauges shorten, namely with D=E, one still obtains (3)=16RD≠0.

The equation (3) is not satisfied, and a non-zero voltage Vs is measured, and thus the tensile stress can be derived.

Again, a calibration straight line is experimentally obtained, which matches the measured voltage with the tensile stress in the screw, which is provided to the end user with the corresponding screw.

Case of Shearing Alone

When applying a shearing force alone on the screw 1, the screw head 2 shortens in the shearing direction and extends in the direction orthogonal to the shearing. In such a case, the first gauges 14a-14d are only slightly deformed and the second gauges 14e-14h extend or shorten according to the shearing direction.

In particular, when a shearing oriented along an axis passing through the gauges 14e and 14g is applied, the latters extend and the gauges 14f and 14h shorten. Thus, the resistance value of the first gauges 14a-14d is not changed, that of the gauges 14e and 14g increases, and that of the gauges 14f and 14h decreases.

More specifically, since the second gauges 14e-14h are opposed by pair, the resistance value of the gauges 14e and 14g increases by a same value F and the resistance value of the second gauges 14f and 14h decreases by a same value −G.

One thus obtains $R2=R4=R+F+R-G=2R+F-G$;

and $R1=R3=2R$.

By substitution in the equation (3), one obtains:

$$(3) = (2R)^2 - (2R+F-G)^2$$
$$= -4RF + 4RG + 2FG - F^2 - G^2$$

It is considered that the shearing is perfect or almost perfect, that is, that the gauges 14e and 14g extend as much as the gauges 14f and 14h decrease, namely F=G.

In such a case, the equation (3) is satisfied, and no voltage is measured.

More generally, regardless of the orientation and the amount of the shearing, the equation (3) is satisfied, and the screw 1 according to the first embodiment thus allows to prevent the parasitic measurement of the shearing stress in the screw head 2, as explained below.

Case of Simultaneous Tension and Shearing

In the case of tension and shearing being applied, for example, a shearing along an axis passing through the gauges 12e and 12g is applied, the following behaviour of the gauges is observed:
 the gauges 14a-14d extend by a value D under the effect of the tension, the shearing generating no effect on them;
 the gauges 14e and 14g shorten by a value E under the effect of the tension and extend by a value F under the effect of the shearing of a value F; and
 the gauges 14f and 14h shorten by a value E under the effect of the tension and shorten again by a value G under the effect of the shearing.

Thus, one obtains:

$R1=R3=2R+2D$, and $R2=R4=R-E+F+R-E-G=2R-2E+F-G$.

By taking the equation (3), one obtains:

$$(3) = (2R+2D)^2 - (2R-2E+F-G)^2$$
$$= 4R^2 + 8RD + 4D^2 - 4R^2 + 8RE - 4RFC +$$
$$4RG + 4EF - 4EG + 2FG - 4E^2 - F^2 - G^2$$

As previously, if considering the shearing as perfect or almost perfect, that is, that the gauges 14e and 14g extend as much as the gauges 14f and 14h shorten, then F=G.

Thus, one obtains (3)=8RD+4D²+8RE−4E²≠0. It can be noted that the deformations of the gauges under the effect of the shearing do not intervene.

Even in the case where the first gauges extend as much as the second gauges shorten, namely with D=E, one still obtains (3)=16RD≠0.

Only tension is measured using the screw 1 according to the second embodiment of the present invention, the value 16RD measured being identical to the case of tension alone.

THIRD EMBODIMENT

Figure 11:
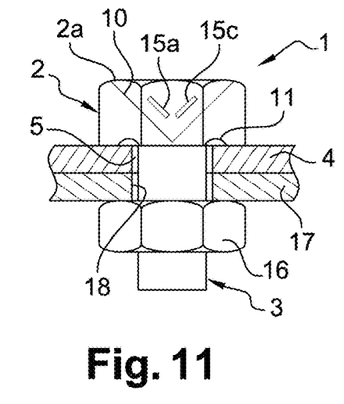
FIG. 11 is a schematic layout, in lateral view and partial cross section, of a screw according to a third embodiment of the present invention, provided with strain gauges to measure shearing.
Figure 12:
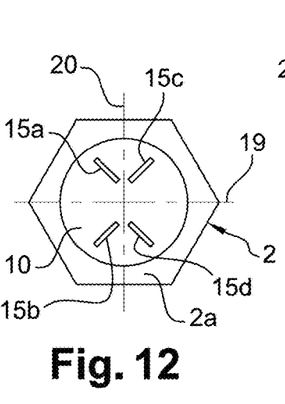
FIG. 12 is a schematic layout, in top view, of the screw according to the third embodiment.

If referring now to FIGS. 11 and 12, a third embodiment of the present invention is shown, in which the screw head 2 comprises strain gauges, so-called gauges for shearing, in particular four gauges 15a-15d attached in the conical hole 10.

The screw 1 is tightened using a nut 16 between a first plate 4 having a through hole 5 and a second plate 17 having a through hole 18.

Figure 13:
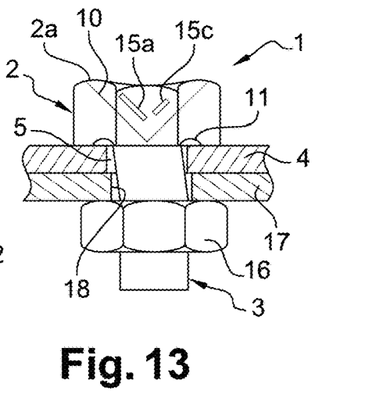
FIG. 13 is a schematic layout, in lateral view and partial cross section, of the screw according to the third embodiment, subjected to a shearing stress.

Each of the gauges 15a-15d has a main measurement direction, shown by the orientation of the represented segment forming each of the gauges 15a-15d in FIGS. 11-13.

The first and second gauges 15a, 15b are arranged such that the main measurement directions thereof are at 45° on either side of a first generatrix of the conical hole 10, and the third and fourth gauges 15c, 15d are arranged in the same manner at 45° on either side of another generatrix diametrically opposed to said first generatrix of the conical hole 10.

The four gauges 15a-15d are electrically connected by the Wheatstone bridge 13.

By taking the group of equations (1), one thus obtains:

$R1=R(15a); R2=R(15c)$;

$R3=R(15b)$; and $R4=R(15d)$.   (4)

Case of Tension Alone

When a tensile force T is applied on the screw 1, particularly during the tightening thereof, the screw head 2 is deformed such that the upper surface 2a thereof becomes concave. In such a case, the gauges 15a-15d all extend by the same value.

Thus, the resistance value of the first gauges 15a-15d increases by a given value H such that R1=R2=R3=R4=R+H.

By substitution in the equation (3), one obtains:

$$(R+H)^2-(R+H)^2=0. \quad (3)$$

The equation (3) is satisfied, and a zero voltage Vs is measured. The screw according to the third embodiment of the present invention thus does not allow to measure a tensile stress alone.

Case of Shearing Alone

If referring to FIG. 13, it can be noted that, when applying a shearing force alone on the screw 1, the gauges 15a-15d extend or shorten according to the shearing direction.

In particular, during a shearing caused by the movement of the plate 17 along a direction 19, the gauges 15a and 15b extend and the gauges 15c and 15d shorten.

Thus, the resistance value of the gauges 15a and 15b increases by a same value I and the resistance value of the second gauges 15c and 15d decreases by a same value J.

Thus, one obtains: R1=R3=R+I and R2=R4=R−J.

By substitution in the equation (3), one obtains:

$$=(R+I)^2-(R-J)^2$$

$$=I^2-J^2+2RI+2RJ \quad (3)$$

Even in the case where shearing is considered as perfect, that is, that the gauges 15a and 15b extend as much as the gauges 15c and 15d shorten, namely with I=J, and by substituting J with I in (3), one still obtains (3)=4RI≠0.

If now considering a shearing caused by the movement of the plate 17 along a direction 20, the gauges 15a and 15c extend and the gauges 15b and 15d shorten.

Thus, the resistance value of the gauges 15a and 15c increases by a same value I and the resistance value of the second gauges 15b and 15d decreases by a same value J.

Thus, one obtains R1=R2=R+I and R3=R4=R−J.

By substitution in the equation (3), one obtains:

$$=(R+I)\cdot(R-J)-(R+I)\cdot(R-J)$$

$$=0 \quad (3)$$

In such a case, the equation (3) is satisfied, a zero output voltage Vs is measured, and the shearing is not measured.

The screw 1 according to the third embodiment thus allows to measure a shearing when knowing beforehand the direction thereof in order to measure the stresses applied in the screw head 2.

In the case of simultaneous tension and shearing, by applying the same logic as the second embodiment, it can be understood that only shearing will be measured.

Again, a calibration curve could be established for each type of screws.

According to a particular embodiment, the screw 1 can comprise both gauges for tension 12a-12d or 14a-14h, and gauges for shearing 15a-15d, each connected by a Wheatstone bridge 13 such as described above.

Thus, such a screw 1 allows to measure both tensile stresses and the stresses of a shearing the direction of which is known, in the screw head 2.

Of course, it is understood that the above embodiments of the present invention have been given for indicative and non-limiting purposes, and that changes could be made thereto without departing from the scope of the present invention.

The invention claimed is:

1. A screw having a screw head and a threaded cylindrical body having a revolution axis, the screw head being provided with strain gauges arranged so as to be deformed together with the deformation of the screw head, in order to measure a stress within the screw, the gauges being connected or able to be connected to a power supply and to determination means for determining the value of at least one stress within the screw from the deformations of the gauges, wherein the screw head has, on the upper face thereof, a conical hole having a revolution axis that is aligned with the revolution axis of the cylindrical body of the screw, and the gauges are arranged on the wall of the conical hole so as to be deformed together with the deformation of the conical hole, the gauges being oriented so as to measure at least one type of stress within the screw selected among the tension and the shearing, in order to determine the stresses within the cylindrical body.

2. The screw according to claim 1, wherein the screw head is provided with four first strain gauges, so-called gauges for tension, and four second strain gauges, also so-called for tension, wherein the first gauges are each arranged with the main measurement direction thereof being aligned with a generatrix of the conical hole and are distributed with an uniform angle between each other, and the second gauges are each arranged with the main measurement direction thereof being on a circle formed at the intersection of the wall of the conical hole and an imaginary plane parallel to the upper face of the screw head, and are distributed at equidistance from each other on the circumference of the circle, the first gauges forming two groups of gauges each comprising two first gauges that are adjacent and electrically connected in series and the second gauges forming two other groups of gauges each comprising two second gauges that are adjacent and electrically connected in series, the four groups of gauges being connected by a Wheatstone bridge connected or able to be connected to the power supply and to the determination means, the first and second gauges allowing to measure the inner tensile stress in the screw head in order to know the stresses within the cylindrical body.

3. The screw (1) according to claim 2, wherein the screw head is a hexagonal head and the main measurement direction of each of the first gauges forms an angle between 30 and 10 degrees with respect to a generatrix joining the apex of the conical hole to a point of intersection of the generating circle of the conical hole with a line segment joining two opposite apexes of the hexagon defining the outline of the upper face of the screw head.

4. The screw according to claim 3, wherein the main measurement direction of each of the first gauges forms an angle of 15 degrees with respect to a generatrix joining the apex of the conical hole to a point of intersection of the generating circle of the conical hole with a line segment joining two opposite apexes of the hexagon defining the outline of the upper face of the screw head.

5. The screw according to claim 2, wherein each second gauge is centered on the main measurement direction of a corresponding one of the first gauges.

6. The screw according to claim 5, wherein each second gauge is integral with the corresponding first gauge, in the form of a double-gauge rosette.

7. The screw according to claim 1, wherein the screw head is provided with four strain gauges, so-called gauges for shearing, the first and third gauges being arranged parallel to two generatrixes located at 45° on either side of a main generatrix of the conical hole, the two other gauges being arranged parallel to two generatrixes located at 45° on either side of another main generatrix of the conical hole that is diametrically opposed to the main generatrix of the conical hole, the four gauges being connected by a Wheatstone bridge connected or able to be connected to the power supply and to the determination means, the gauges allowing to measure the inner shearing stress in the screw head in order to know the stresses in the cylindrical body.

8. The screw according to claim 1, wherein the screw head is provided with four strain gauges, so-called gauges for tension, wherein two gauges are each arranged with the main measurement direction thereof being aligned with a generatrix of the conical hole, the two generatrixes being diametrically opposed, and the two other gauges are each arranged with the main measurement direction thereof being on a circle formed at the intersection of the wall of the conical hole and an imaginary plane parallel to the upper face of the screw head, and are distributed at equidistance from each other on the circumference of the circle, each one being centered on a respective one of the two generatrixes, the four gauges being connected by a Wheatstone bridge connected or able to be connected to the power supply and to the determination means, the gauges allowing to measure the inner tensile stress when shearing is not applied in the screw head.

9. The screw according to claim 1, wherein the conical hole has a height lower than or equal to that of the screw head.

10. The screw according to claim 1, wherein the angle at the apex of the cone is between 70 and 150 degrees.

11. The screw according to claim 1, wherein the angle at the apex of the cone is between 75 and 120 degrees.

12. The screw according to claim 1, wherein the angle at the apex of the cone is of 90 degrees.

13. The screw according to claim 1, wherein a groove is formed on the lower surface of the head of the screw and in a concentric and adjacent manner with respect to the threaded cylindrical body.

14. The screw according to claim 1, wherein the strain gauges are connected or able to be connected to the power supply and to the determination means in a wireless manner, the gauges being connected to a first near field communication type wireless transceiver, and the power supply and the determination means being connected to a second near field communication type wireless transceiver, the first and second transceivers being able to wirelessly transmit power and information therebetween.

\* \* \* \* \*